US010782891B1

(12) United States Patent
Martin et al.

(10) Patent No.: US 10,782,891 B1
(45) Date of Patent: Sep. 22, 2020

(54) AGGREGATED HOST-ARRAY PERFORMANCE TIERING

(71) Applicant: EMC IP HOLDING COMPANY LLC, Hopkinton, MA (US)

(72) Inventors: Owen Martin, Hopedale, MA (US); Adnan Sahin, Needham Heights, MA (US); Gabriel Benhanokh, Tel-Aviv (IL); Arieh Don, Newton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 491 days.

(21) Appl. No.: 15/393,405

(22) Filed: Dec. 29, 2016

(51) Int. Cl.
*G06F 3/06* (2006.01)
(52) U.S. Cl.
CPC .......... *G06F 3/0619* (2013.01); *G06F 3/0665* (2013.01); *G06F 3/0689* (2013.01)
(58) Field of Classification Search
CPC ..... G06F 3/0619; G06F 3/0689; G06F 3/0665
See application file for complete search history.

(56) References Cited

U.S. PATENT DOCUMENTS 7,539,709 B1 * 5/2009 Vengerov .......... G06F 17/30067

* cited by examiner

*Primary Examiner* — Michael Alsip
(74) *Attorney, Agent, or Firm* — Anderson Gorecki LLP

(57) ABSTRACT

Non-volatile cache in a host computer provides a storage tier in a system that includes at least one other tier of storage in a storage array. Selected data of a host device that represents a storage array production volume is stored in non-volatile cache. An MPIO driver in the host computer accesses the non-volatile cache or the storage array in response to an IO from a host application to the host device. A tiering engine in either the host computer or the storage array uses data access statistics to calculate which data should be promoted or demoted to non-volatile cache. Data access statistics indicative of access to non-volatile cache may be provided to the storage array by the host computer. Data changes may be aggregated by the host computer and asynchronously destaged to the storage array. Data changes or dirty data discard messages may be exchanged by peer host computer synchronously with a write operation.

20 Claims, 6 Drawing Sheets

AGGREGATED HOST-ARRAY PERFORMANCE TIERING

BACKGROUND

The subject matter of this disclosure is generally related to computer networks in which a data storage system is used to maintain data for host applications that may be used by multiple concurrent users. The host applications run on host computers and may share large data sets. The data storage system manages access to host application data stored on tangible data storage devices such as disk drives and flash drives. More particularly, the data storage system presents one or more logical production volumes to the host applications and, in response to IOs that reference the production volumes, accesses the tangible data storage devices that back the logical production volumes.

SUMMARY

All examples, aspects and features mentioned in this document can be combined in any technically possible way.

In accordance with an aspect an apparatus comprises: a computing device comprising a processor, a non-volatile cache, a host application, and a tiering engine that causes a first extent of host application data to be demoted to a storage array and causes a second extent of host application data to be promoted to the non-volatile cache, the promotion and demotion based on likelihood of future access of the first and second extents of host application data. In some implementations a multi-path input-output driver is responsive to an IO (input-output) request from the host application to determine whether the IO request maps to a storage array address or a non-volatile cache address, and service the request from the address to which the request maps. In some implementations the computing device is a first host computer that maintains a first host device that is a representation of a production volume maintained by a storage array, wherein some of the host application data of the host device is stored on the non-volatile cache, and wherein a second host computer maintains a second host device that is a representation of the production volume. In some implementations in response to a data change associated with the IO the first host computer synchronously sends the data change to the second host computer. In some implementations in response to a data change associated with the IO the first host computer synchronously sends a message to the second host computer to prompt discard of a stale copy of data associated with the IO from the second host device. In some implementations the first host computer aggregates data changes and asynchronously sends the aggregated data changes to the storage array. In some implementations in response to a data change associated with the IO the computing device updates data access statistics maintained by the computing device. In some implementations the likelihood of future access is calculated by the computing device based on the data access statistics.

In accordance with an aspect an apparatus comprises: a storage array comprising a plurality of computing nodes, managed drives, and a tiering engine that causes a first extent of host application data to be demoted from non-volatile caches of a plurality of host computers to the managed drives and causes a second extent of host application data to be promoted to the non-volatile caches of the plurality of host computers based on likelihood of future access of the first and second extents of host application data. In some implementations the tiering engine calculates the likelihood of future access based in part on data access statistics provided to the storage array by the plurality of computing nodes and generates hints.

In accordance with an aspect a method comprises: in a network comprising a plurality of host computers and a storage array, wherein the host computers run instances of a host application that share a data set that is maintained on production volume that is presented by the storage array: storing at least a first extent of host application data in non-volatile caches of the host computers, wherein the non-volatile caches represent a first tier of storage; storing at least a second extent of host application data in a managed drive of the storage array, wherein the managed drive represents a second tier of storage; and demoting the first extent of host application data to the storage array and promoting the second extent of host application data to the non-volatile caches based on likelihoods of future access of the first and second extents of host application data. Some implementations comprise responding to an IO (input-output) request from one of the instances of the host application by determining whether the IO request maps to a storage array address or a non-volatile cache address. Some implementations comprise servicing the request from the address to which the request maps. Some implementations comprise a first one of the host computers maintaining a first host device that is a representation of the production volume, wherein at least some host device data is stored on the non-volatile cache, and a second one of the host computers maintaining a second host device that is a representation of the production volume. Some implementations comprise, responsive to a data change associated with the IO, the first host computer synchronously sending the data change to the second host computer. Some implementations comprise, responsive to a data change associated with the IO, the first host computer synchronously sending a message to the second host computer to prompt discard of a stale copy of data associated with the IO from the second host device. Some implementations comprise the first host computer aggregating data changes and asynchronously sending the aggregated data changes to the storage array. Some implementations comprise the first and second computing devices updating data access statistics maintained locally by the first and second computing devices, and the computing devices calculating the likelihood of future access based on the data access statistics. Some implementations comprise a tiering engine in the storage array generating a first hint to cause the first extent of host application data to be demoted to the storage array and generating a second hint to cause the second extent of host application data to be promoted to the non-volatile host caches. Some implementations comprise the tiering engine calculating the likelihood of future access based in part on data access statistics provided to the storage array by the plurality of computing nodes.

DETAILED DESCRIPTION

Some aspects, features and implementations described herein may comprise computer devices, components and computer-implemented steps or processes. It should be apparent to those of ordinary skill in the art that the computer-implemented steps or processes may be stored as computer-executable instructions on a non-transitory computer-readable medium. Furthermore, it should be understood by those of ordinary skill in the art that the computer-executable instructions may be executed on a variety of tangible processor devices. For ease of exposition, not every step, process or element is described herein as part of a computer system. Those of ordinary skill in the art will recognize steps, processes and elements that may have a corresponding computer system or software component. Such computer system and software components are therefore enabled by describing their corresponding steps, processes or elements, and are within the scope of the disclosure.

The terminology used in this description is intended to be interpreted broadly within the limits of subject matter eligibility. The terms "logical" and "virtual" are used to refer to features that are abstractions of other features or tangible devices. For example, multiple virtual computing devices could operate simultaneously on one tangible computing device. A "host application" is a computer program that accesses a storage service from a storage system via a storage network. A "production volume" is a logical unit of storage presented by a storage system for use by host applications. The storage system manages the underlying tangible storage devices used to implement the storage services for the production volume. Without limitation, the production volume may be referred to as a device, logical volume, production LUN or host LUN, where LUN (logical unit number) is a number used to identify the production volume in accordance with the SCSI (small computer system interface) protocol. Multiple production volumes may be organized as a storage group. The term "logic" as used herein refers to instructions that are stored on a non-transitory computer-readable medium and implemented by a processor or instructions implemented by programmed, programmable, or purpose-designed electronic components and other hardware.

Figure 1:
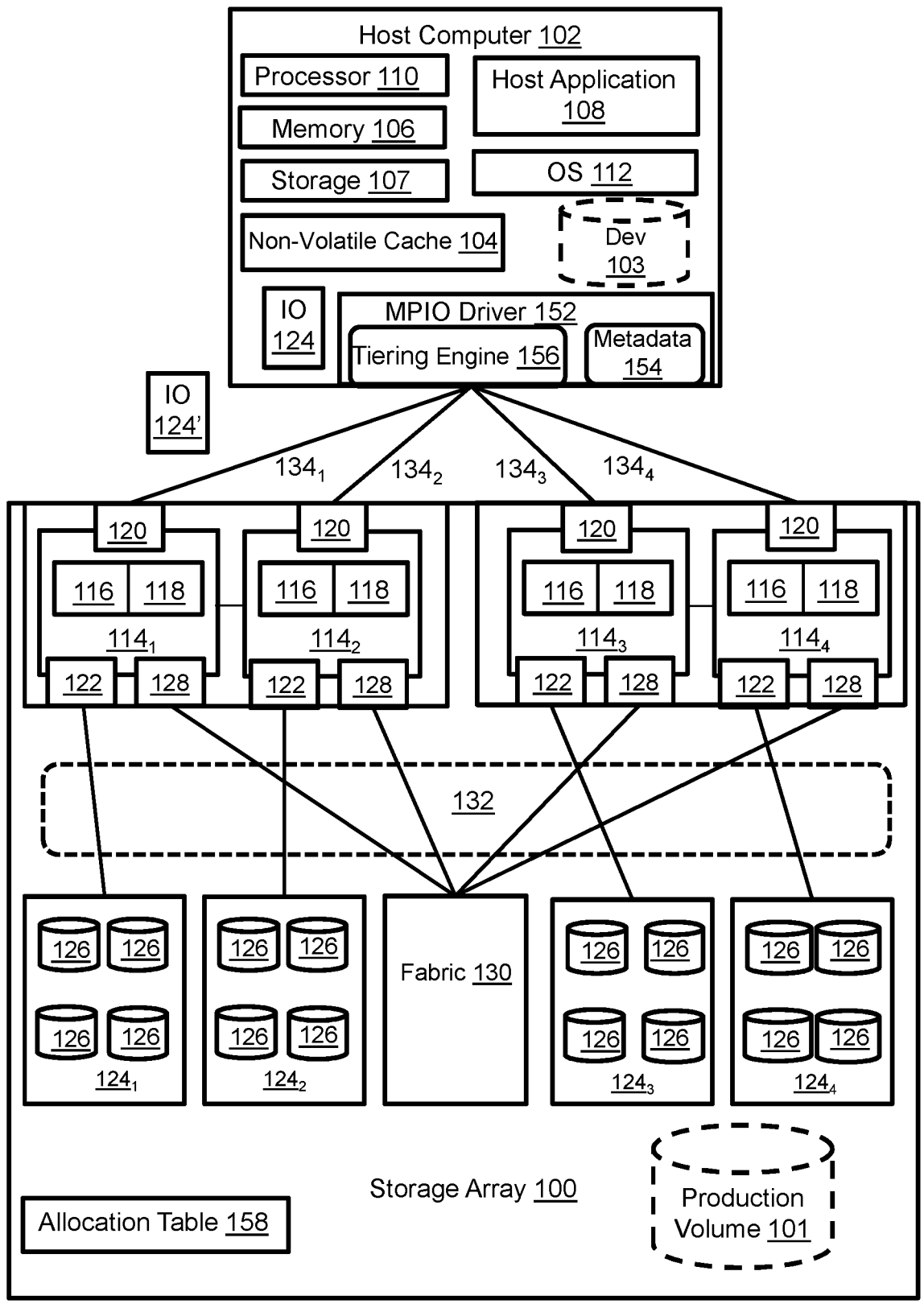
FIG. 1 illustrates a computer network in which aggregated host-array performance tiering is implemented for data associated with a production volume presented by a non-tiering storage array.

FIG. 1 illustrates a computer network in which aggregated host-array performance tiering is implemented for data associated with a production volume 101 that is presented by a non-tiering storage array 100. Production volume 101 data is stored on managed drives 126 of the storage array 100. An MPIO (multi-path input-output) driver 152 of a host computer 102 discovers the production volume 101 and creates a logical host device 103 that is a representation of the production volume 101. Host device 103 is presented to the host application 108. Selected data associated with the host device 103 is stored in non-volatile cache 104 of the host computer 102.

The production volume 101 and host device 103 represent abstraction layers between the managed drives 126, non-volatile cache 104 and a host application 108. From the perspective of the host application 108 the host device 103 is a single data storage device having a set of contiguous fixed-size LBAs (logical block addresses) on which data used by the host application 108 resides. However, the data used by the host application may actually be maintained at non-contiguous addresses on the managed drives 126 and the non-volatile cache 104. As will be explained below, the managed drives 126 and non-volatile cache 104 may be the basis of different performance tiers.

The storage array 100 may include a plurality of computing nodes $114_1$-$114_4$, pairs of which ($114_1$, $114_2$) and ($114_3$, $114_4$) may be organized as storage engines for purposes of failover. Each computing node includes at least one tangible multi-core processor 116 and a local cache 118. The local cache may include, for example and without limitation, volatile memory components such as RAM (random access memory) and non-volatile memory components such as high performance SSDs (solid state devices). Each computing node in the storage array may include one or more FEs 120 (front-end directors, a.k.a. front end adapters) for communicating with the host computer 102. Each computing node may also include one or more CAs (channel directors, aka channel adapters) 128 for communicating with other computing nodes via an interconnecting fabric 130. A portion or partition of each respective local cache 118 may be allocated to a virtual shared cache 132 that can be accessed by other computing nodes, e.g. via DMA (direct memory access) or RDMA (remote direct memory access). Each computing node $114_1$-$114_4$ may also include one or more BEs 122 (back end directors, a.k.a. back end adapters) for communicating with respective associated back end storage bays $124_1$-$124_4$, thereby enabling access to the managed drives 126.

The managed drives 126 associated with the storage array 100 may include tangible storage devices of various different technology types and levels of performance in terms of response time for read and write operations. For example and without limitation, the managed drives 126 may include SSDs such as flash, and HDDs (hard disk drives) such as SATA (Serial Advanced Technology Attachment) and FC (Fibre Channel). For purposes of explanation the managed drives 126 in FIG. 1 may be assumed to all be of a single technology type with the same read/write performance. For example, the storage array 100 may be an "all flash" array in which the managed drives 126 are a particular type of SSD. Because the managed drives 126 are not differentiated in terms of performance, the storage array 100 may not necessarily include a performance tiering engine that selects storage media for particular extents of data based on likelihood of those extents being accessed in the near future. In other words, the storage array may not necessarily be specifically adapted for supporting multiple tiers.

The host computer 102 may be a type of server with volatile memory 106, persistent storage 107, a tangible multi-core processor 110, and an OS (operating system) 112. The non-volatile cache 104 of the host computer 102 may include high performance SSDs such as PCM (phase change memory) of a type referred to herein as SCM (storage class memory), an example of which is presently known under the trade name 3DXP (three-dimension cross-point) memory. Storage class memory is currently an emerging memory technology that may come to be known by a variety of names in the future. The terms "SCM" and "non-volatile cache" are therefore used broadly in this disclosure to encompass the memory technology without being limited to any specific manufacturer's product associated with any particular name or trade name. The non-volatile cache 104 may be implemented close to the host processor 110. For example and without limitation, the non-volatile cache may be implemented in a DIMM (dual inline memory module) on the same motherboard as the host computer processor 110, or on the same semiconductor die as the processor. Thus, host application data may be accessed by the host processor 110 more quickly from the non-volatile cache 104 than from the storage array 100.

The host device 103 may be created and maintained in order to implement aggregated host-array performance tiering. The host device 103 is a logical device that represents the production volume 101. However, whereas the data of production volume 101 is stored in the managed drives 126, at least some of the data of host device 103 is stored in the non-volatile cache 104. Metadata 154, for example an extent bitmap, indicates which addresses of the host device 103 map to non-volatile cache 104 and which addresses map to the storage array 100. The metadata 154 may include pointers to address locations of host application data in the non-volatile cache 104. A tiering engine 156 in the host computer 102 makes data promotion and demotion decisions for the host device 103. For example, the tiering engine may demote extents of host application data from the non-volatile cache 104 portion of the host device 103 to the production volume 101, and thus to managed drives 126, of the storage array 100, e.g. in order to free space for other host application data that is "hotter," where hotter means more recently or more frequently accessed, or more likely to be accessed in the near future, e.g. pre-fetch. The tiering engine 156 may also promote extents of host application data to the non-volatile cache 104 portion of the host device 103, e.g. when that data is changed, written or read from the production volume 101, and thus from managed drives 126, of the storage array. In order to facilitate performance tiering decisions the tiering engine 156 may maintain data access statistics that indicate, e.g. frequency of access, most recently accessed extents, probability of near-future access, and any of a wide variety of other statistics that may be used for automated performance tiering. In general, the "coldest" extents, e.g. least frequently, recently or likely to be accessed, may be evicted to free space for "hotter" extents.

The tiering engine 156 and metadata 154 may be integrated into the MPIO driver 152 in the host computer 102. The MPIO driver is responsive to IO requests to host device 103 from the host application 108. If an IO 124 from the host application 108 is a write operation then the MPIO driver 152 may write the data to the non-volatile cache 104 portion of host device 103 and update associated metadata 154. If IO 124 is a read operation then the MPIO driver 152 uses the metadata 154 to determine whether the host device address specified in the IO 124 maps to non-volatile cache 104 or the storage array 100. If the host device address specified in IO 124 maps to non-volatile cache 104 then the MPIO driver accesses the requested data from the non-volatile cache and provides a copy to the host application 108 in order to service the IO 124. If the host device address specified in IO 124 does not map to non-volatile cache 104 then the MPIO driver 152 accesses the storage array 100 in order to service the IO 124. In particular, the MPIO driver translates the host device address into a production volume address and sends corresponding IO 124' to the storage array. There are multiple paths $134_1$-$134_4$ between the host computer 102 and the storage array 100, e.g. one path per FE 120. Each path may have a locally unique address that is known to the MPIO driver 152. However, the host OS 112 and host application 108 are not aware of the paths and addresses because they are sending IOs to host device 103. Only when the data is not in the non-volatile cache does the MPIO driver select one of the paths $134_1$-$134_4$ to send the IO 124' to the storage array 100. The paths may be selected by the MPIO driver 152 based on a wide variety of techniques and algorithms including, for context and without limitation, performance and load balancing.

In order to service IOs to production volume 101 from the MPIO driver 152 the storage array 100 maintains metadata indicative of the locations of extents of host application data on the managed drives. For example, in response to IO 124' from the host computer 102 the storage array 100 searches for a pointer in metadata maintained in an allocation table 158. Entries in the allocation table may include pointers that associate production volume addresses indicated by the IO 124' with addresses in the managed drives 126. The pointer, if it exists, indicates where to find the data in the managed drives 126. The data is then retrieved and sent from the storage array 100 to the host computer 102. The MPIO driver 152 may promote the data to non-volatile cache 104 by storing a copy thereon and updating metadata 154. If no pointer is found in the allocation table 158 then storage space is allocated in the managed drives 126 and a pointer entry is made in the allocation table 158 pointing to the allocated space. Maintaining metadata that maps actual locations of host application data on the managed drives 126 to locations on the production volume 101 allows data to be placed on the managed drives in accordance with various techniques for balancing performance against utilization efficiency. The storage array 100 temporarily places data for servicing IO 124' in the shared cache 132. For example, data being read may be copied from the managed drives to shared cache, and data being written may be temporarily staged in shared cache before being flushed to the managed drives. The shared cache 132 may enable the production volume 101 to be reachable via all of the computing nodes and paths, although the storage array can be configured to limit use of certain paths to certain logical volumes. For example, the logical volume 101 may be configured to be accessible via only a subset of FAs 120.

The tiering engine 156 may make data promotions and demotions by sending reads and writes to the storage array. For example, data that is being demoted from non-volatile cache 104 to the managed drives 126 may be sent to the storage array in a write IO. Similarly, data that is being promoted to non-volatile cache may be read from the storage array and copied into the non-volatile cache 104. In both situations the metadata 154 is updated accordingly. As mentioned above, the tiering engine maintains data access statistics with which to make the decisions.

Figure 2:
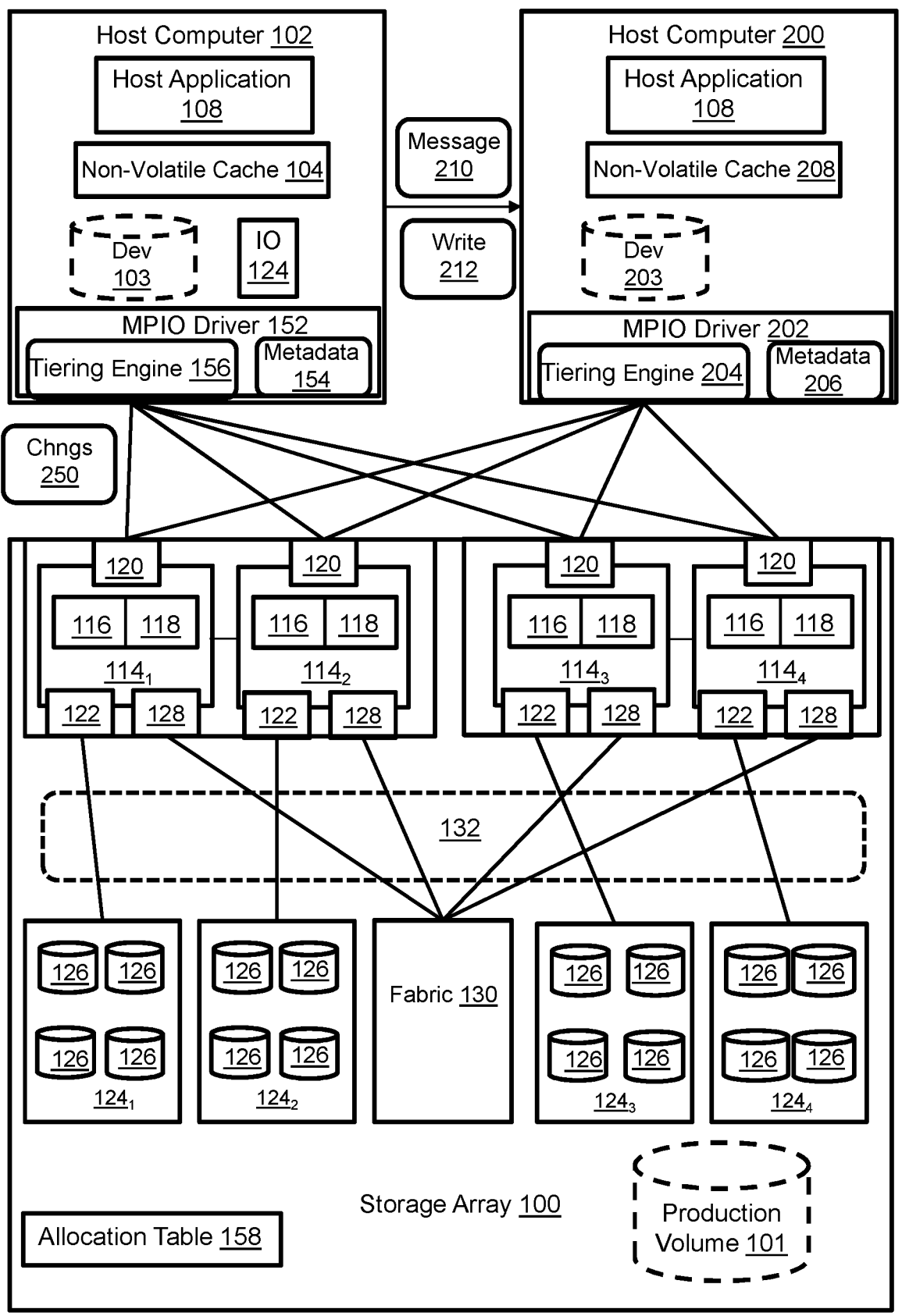
FIG. 2 illustrates coordination between host computers and the storage array to maintain data consistency in the computer network of FIG. 1.

FIG. 2 illustrates coordination between multiple host computers 102, 200 and the storage array 100 to maintain consistency in the computer network of FIG. 1. Host computer 200 runs an instance of the host application 108 that utilizes the same data set as the instance of host application 108 running on host computer 102. Host computer 200 includes an MPIO driver 202, tiering engine 204, metadata 206, non-volatile cache 208 and a processor, memory and storage (not specifically illustrated). A host device 203 in host computer 200 is a representation of the production volume 101 that is presented to the host application 108 on host computer 200 by MPIO driver 202. Selected data of host device 203 is stored in the non-volatile cache 208, although data of the production volume is stored in the managed drives 126 of the storage array as already described.

When the host application 108 instance on host computer 102 performs a write to host device 103, the host computer 200 is informed and the write data is made available to host computer 200 and the storage array 100. For example and without limitation the host computer 102 may, synchronously with performance of the write, send a message 210 to host computer 200 to prompt MPIO driver 202 to discard the stale data corresponding to the write data from host device 203. The MPIO driver 202 updates metadata 206 accordingly, e.g. to indicate that the corresponding space in non-volatile cache 208 is free. The host computer 102 may collect changes 250 to data in non-volatile cache 104 due to multiple writes over some specified period of time, e.g. x seconds, and then asynchronously send the changes 250 to the storage array 100. The storage array may temporarily buffer the changes 250 and subsequently implement the changes by writing to the managed drives 126 once all changes have been received. Thus, host computer 200 may obtain the updated data corresponding to the discarded stale data by accessing the storage array 100.

As an alternative to sending message 210 the host computer 102 may, synchronously with performance of the write, send a write 212 with data corresponding to IO 124 to host computer 200. The host computer 200 may then implement the write to logical device 203 by writing the data to non-volatile cache 208, thereby maintaining consistency between host device 103 and host device 203. The message 210 or write 212 may be sent via NVMe (non-volatile memory express).

Figure 3:
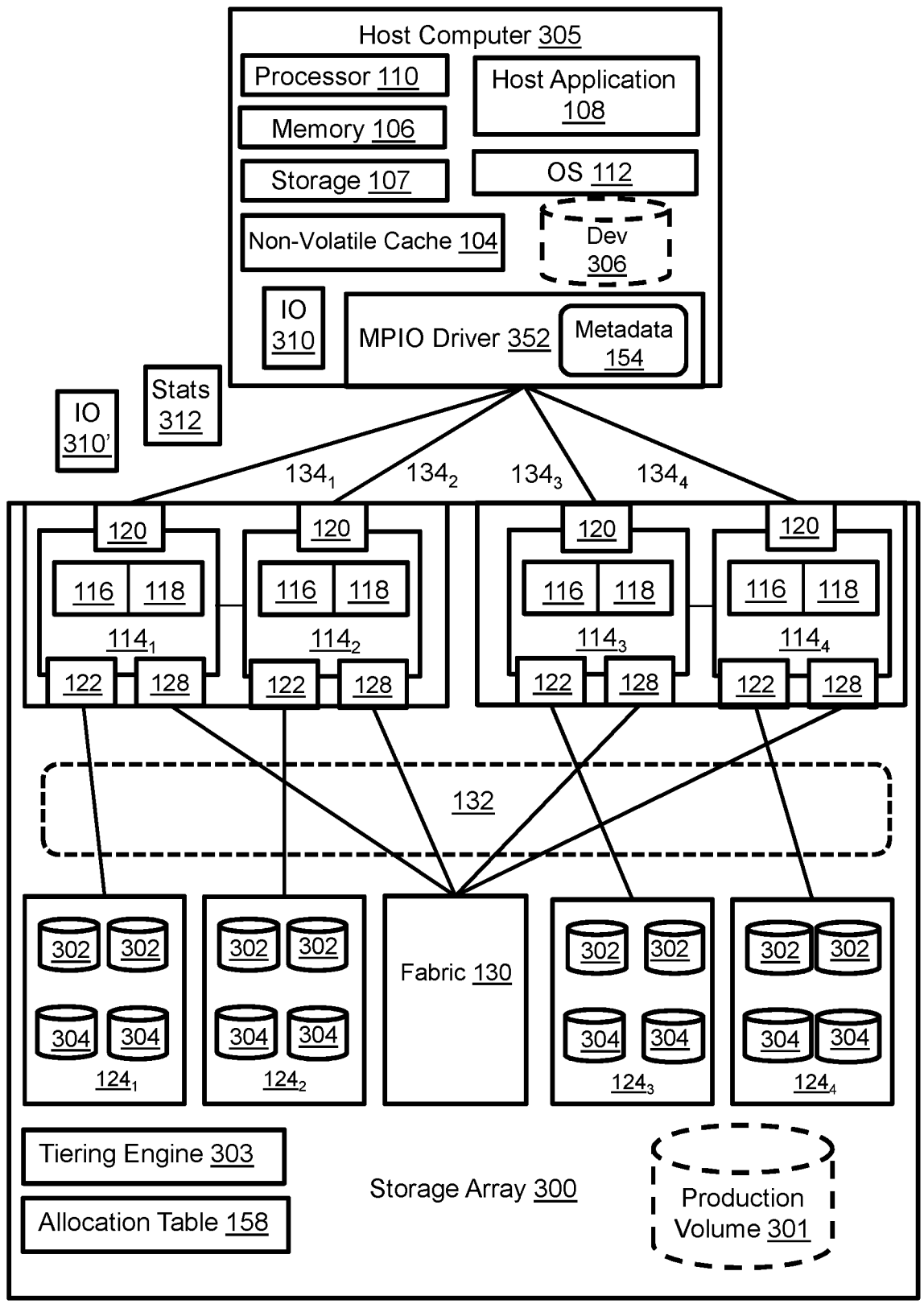
FIG. 3 illustrates a computer network in which aggregated host-array performance tiering is implemented for data associated with a production volume presented by a tiering storage array.

FIG. 3 illustrates a computer network in which aggregated host-array performance tiering is implemented for data associated with a production volume 301 that is presented by a tiering storage array 300. A host computer 305 does not include a tiering engine in this example although both the host computer and the storage array could include tiering engines and monitor data access statistics. The tiering storage array 300 may include some of the features and components already described above, such as a plurality of computing nodes $114_1$-$114_4$ that may each include at least one tangible multi-core processor 116 and a local cache 118, one or more FEs 120, one or more CAs 128, a virtual shared cache 132, and one or more BEs 122 for communicating with respective associated back end storage bays $124_1$-$124_4$. Managed drives 302, 304 may have different performance characteristics. For example and without limitation, managed drives 302 may be SSDs and managed drives 304 may be HDDs. The host computer 305 may include some of the features and components already described above, such as non-volatile cache 104, volatile memory 106, persistent storage 107, tangible processors 110, and an OS 112.

A host application 108 generates IOs to access a host device 306 that is a representation of production volume 301. In response to an IO 310 to the host device 306 from the host application 108 the MPIO driver 352 refers to metadata 154 to determine whether the host device address specified in the IO 310 maps to the non-volatile cache 104 or the storage array 300. If the address maps to the non-volatile cache 104 then the MPIO driver accesses the non-volatile cache in order to service the IO. If the address maps to the storage array then the MPIO driver translates the host device address into a production volume address, generates a corresponding IO 310', and selects a path $134_1$-$134_4$ to reach the storage array. The MPIO driver sends the IO 310' to the storage array on the selected path and the storage array services the IO as already described above.

Three different performance tiers may be implemented based on non-volatile cache 104, SSD managed drives 302 and HDD managed drives 304. A performance tiering engine 303 of the storage array 300 coordinates with the MPIO driver 252 to control promotion and demotion of host application data between the performance tiers. Because the storage array is a SCSI target, the storage array may not be able to send commands to the host computer. Consequently, MPIO driver 352 polls the storage array so that tiering engine 303 can respond with hints (indications) of which data should be promoted and demoted to non-volatile cache 104. The MPIO driver can implement the promotions and demotions in response to the hints with read and write operations as already described above. Promotion and demotion of data between the performance tiers based on managed drives 302, 304 within the storage array may be based on access to the production volume 301. For example, the tiering engine 303 may promote and demote host application data between performance tiers based on access statistics associated with the production volume 301 in terms of frequency of access, most recent access, likelihood of future access, e.g. pre-fetch, and any of a wide variety of factors that may indicate likelihood of future access. With regard to the performance tier associated with non-volatile cache 104 the tiering engine may cause promotion and demotion of data based on access statistics associated with host device 306. For example and without limitation, the tiering engine 303 may cause promotion of the "hottest" data of host device 306 to the non-volatile cache 128 by hinting via publishing tracks to be read in response to polling by the MPIO driver, while using the SSDs 302 to maintain other less hot but relatively active data that cannot be accommodated in the non-volatile cache, and maintain relatively inactive data in the HDDs 304. Promotion and demotion of data with regard to the non-volatile cache may include updating metadata 154.

Because at least some IOs to the host device 306 that result in access to the non-volatile cache 104 may not be presented to the storage array, e.g. reads to the non-volatile cache, the host computer 305 generates data access statistics 312 or other information indicative of host device data access activity associated with the non-volatile cache. The data access statistics 312 are sent from the host computer to the storage array and used by the tiering engine 303 to make data promotion and demotion calculations for providing hints to the MPIO driver. Consequently, the tiering engine 303 accounts for IOs that access the storage array and IOs that access the non-volatile cache when calculating how likely it is that data will be accessed in the future. The tiering engine 303 may thus provide hints to MPIO for managing the non-volatile cache portion of the logical device 306 as a distinct performance tier.

Figure 4:
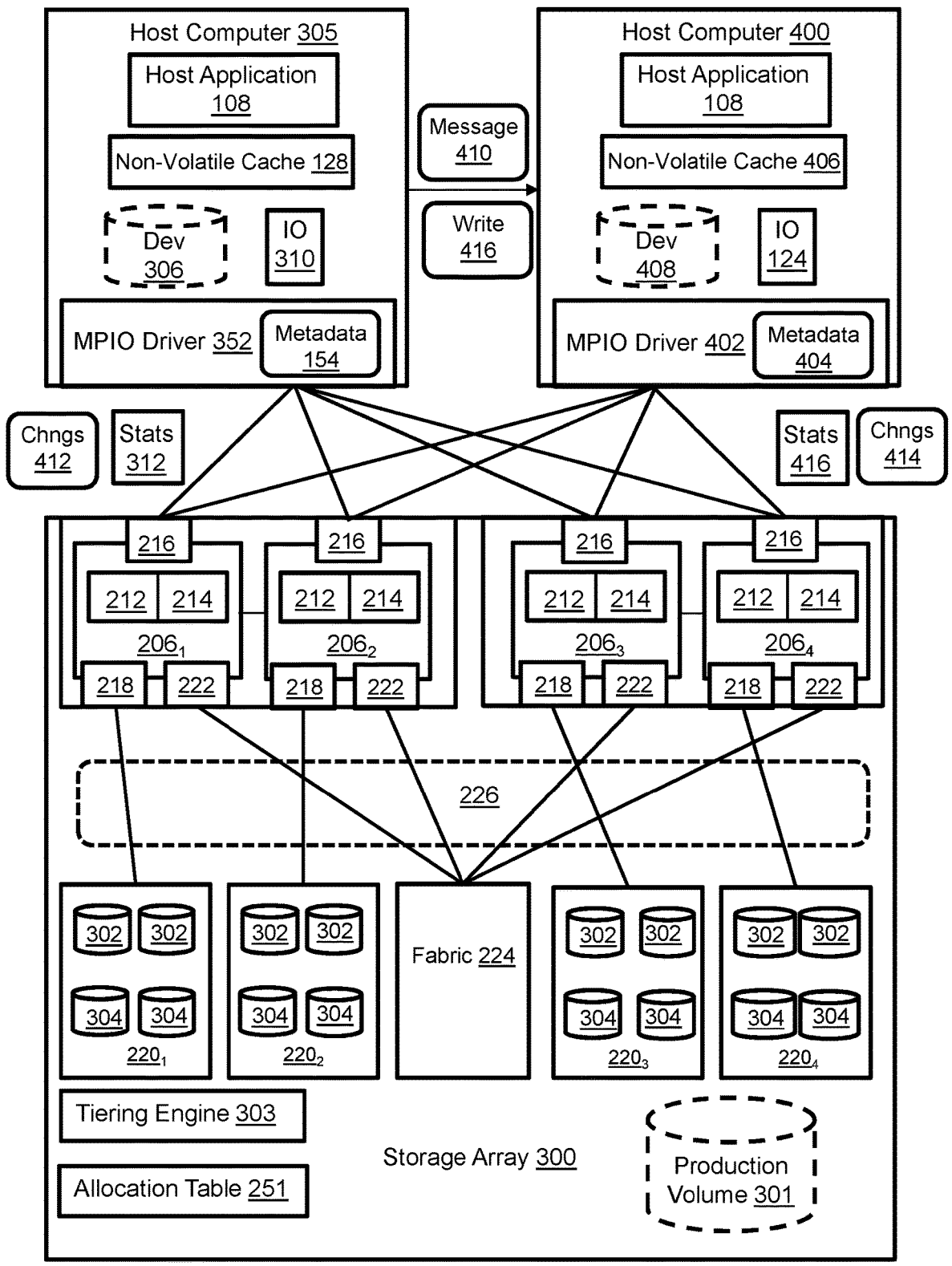
FIG. 4 illustrates coordination between host computers and the storage array to maintain data consistency in the computer network of FIG. 3.

FIG. 4 illustrates coordination between host computers and the storage array to maintain data consistency in the computer network of FIG. 3. Host computer 400 runs an instance of the host application 108 that utilizes the same data set as the instance of host application 108 running on host computer 305. Host computer 400 includes an MPIO driver 402, metadata 404, non-volatile cache 406, and a processor, memory and storage (not specifically illustrated). A host device 408 in host computer 400 is a representation of production volume 301. At least some of the data of host device 408 is stored in the non-volatile cache 406. When the host application 108 instance on host computer 305 performs a write to host device 306, the host computer 400 is informed and the write data is made available to both host computer 400 and the storage array 300. For example and without limitation the host computer 305 may, synchronously with performance of the write to host device 306, send a message 410 to host computer 400 to prompt MPIO driver 402 to discard the corresponding stale data from host device 408, e.g. by updating metadata 404 to indicate that the data is in the storage array rather than non-volatile cache 406. Host computer 400 sends similar messages to host computer 305 when writing to host device 408.

The host computers 305, 400 may each collect respective changes 412, 414 to data in their non-volatile caches 128, 406 due to multiple writes over some specified period of time, e.g. x seconds, and then asynchronously send the changes 412, 414 to the storage array 100. The storage array may temporarily buffer the changes and implement them by writing to the managed drives 302, 304 once all changes have been received. Thus, host computer 400 may obtain the updated data corresponding to the stale data discarded in response to message 410 by accessing the storage array 300. As an alternative to sending message 410 the host computer 305 may, synchronously with performance of the write associated with IO 310, send a corresponding write 416 with data to host computer 400. The host computer 400 may then implement the write 416 to host device 408 by writing the data to non-volatile cache 406, thereby maintaining consistency between host device 306 and host device 408. The message 410 or write 416 may be sent via NVMe (non-volatile memory express).

As already mentioned above, the storage array tiering engine 303 and MPIO drivers coordinate to promote and demote host application data between host-based and array-based performance tiers based on frequency of access, most recent access, likelihood of future access, e.g. pre-fetch, and any of a wide variety of factors that may indicate likelihood of future access. In the illustrated multi-host environment both host computer 305 and host computer 400 generate respective data access statistics 312, 416 or other information indicative of local host application data access activity to non-volatile cache within the respective host computers, e.g. reads. The data access statistics 312, 416 are sent from the host computers to the storage array and used by the tiering engine 303 to make data promotion and demotion calculations in order to generate hints that are shared as already described above. Consequently, the tiering engine 303 accounts for IOs that access the storage array and IOs that access the non-volatile caches of the host computers when calculating how likely it is that data will be accessed in the future. The non-volatile cache tier of each host computer may be based on data access statistics for multiple host computers, e.g. a cluster, or the data access statistics for an individual host computer. For example and without limitation, the tiering engine 303 may generate hints to promote the "hottest" data for the host computers 305, 400 in the aggregate to the non-volatile caches 128, 406, use the SSDs 302 to maintain other less hot but relatively active data that cannot be accommodated in the non-volatile cache, and maintain relatively inactive data in the HDDs 304. Because the tiering engine has a network-wide perspective of data access activity it is possible or likely that host application data that is globally (e.g., cluster-wide) "hot" enough to be placed in non-volatile cache will not be equally active on every host computer. Because the host device access activity may be used in the aggregate in generating hints such data may be present in the non-volatile cache of a host computer in which the data is statistically "cold." Such a global perspective on tiering may facilitate migration of clients to different host applications on different host computers, and migration of instances of host applications to different host computers.

Data that is present in the non-volatile cache portions of the host devices may also be maintained in the storage array. As previously explained, the host computers send aggregated changes 412, 414 to the storage array. Those changes are written to the managed drives. The managed drive copy of the host application data that is present in the non-volatile cache tier may be promoted to a high performance tier in the storage array by the tiering engine 303. As a result, the storage array copy of the data may be more quickly available in the event of a host computer or host application failover or restart.

Figure 5:
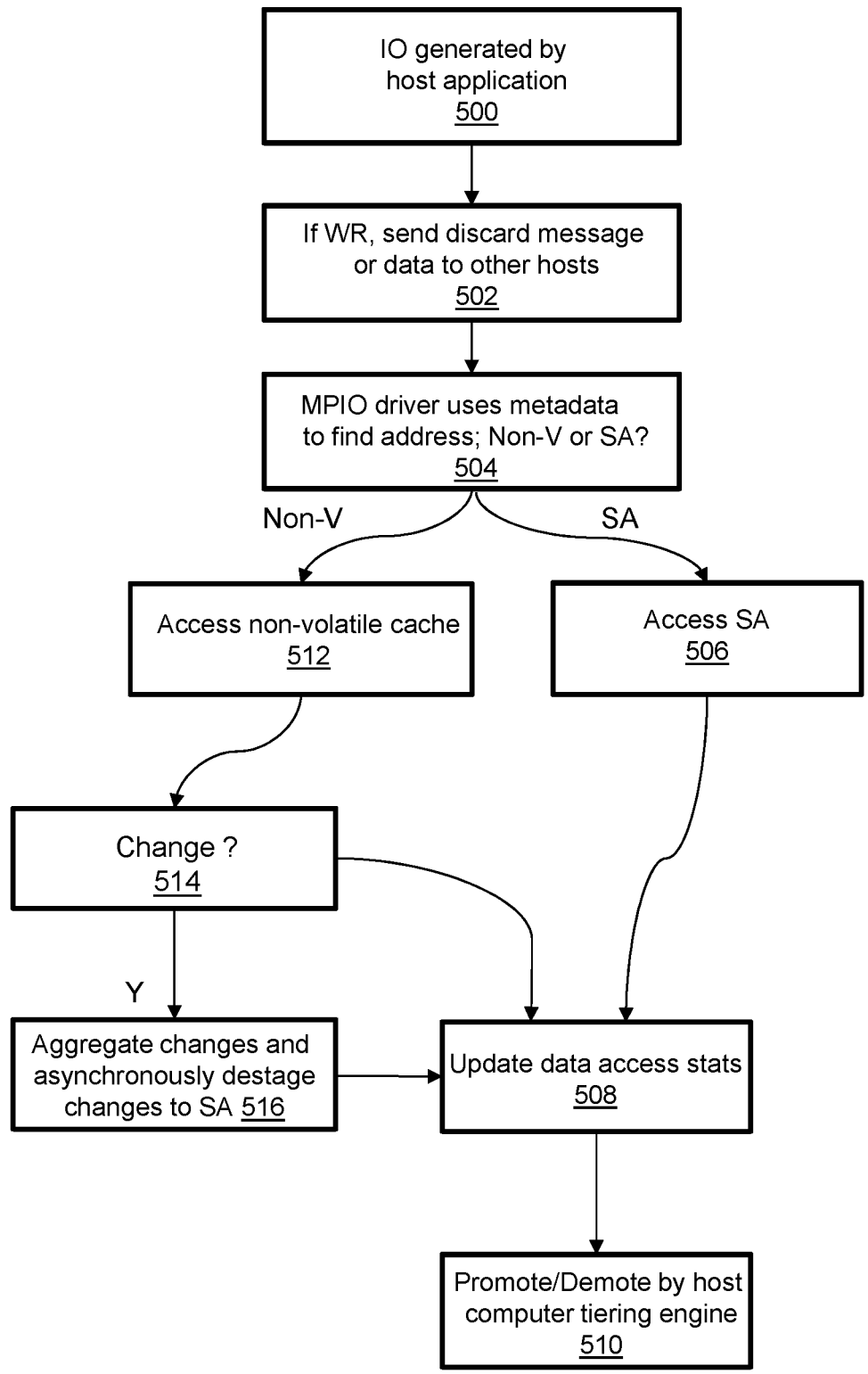
FIG. 5 illustrates a technique for aggregated host-array performance tiering in the computer network of FIGS. 1 and 2.

FIG. 5 illustrates a technique for aggregated host-array performance tiering in the computer network of FIGS. 1 and 2. If an IO generated by a host application as shown in block 500 is a write then the host computer may synchronously send a discard message or the write data to other host computers as indicated in block 502 so that those host computers do not read locally stored stale copies. The MPIO driver in the host computer uses metadata to determine the location to which the IO address maps as indicated in block 504. The IO may specify an address in the host device and the metadata may map to the storage array or the non-volatile cache. If the address maps to the storage array then the MPIO driver accesses the storage array by sending the IO as indicated in block 506. Data access statistics maintained in the storage array are updated as indicated in block 508. Promotion and demotion may be performed by the host computer tiering engine as indicated in block 510. If the address maps to the non-volatile cache as determined in block 504 then the MPIO driver accesses the non-volatile cache as indicated in block 512. If the access results in a change as determined in block 514, e.g. if the IO is a write, then the host may aggregate the change with other changes over some period of time and asynchronously destage those changes to the storage array as shown in block 516. Regardless of whether there was a change, the host computer updates locally maintained data access statistics as indicated in block 508. Data promotion and demotion decisions are made by the host computer tiering engine as indicated in block 510. Demotion may be accomplished by writing the demoted data to the storage array and marking the associated space in non-volatile storage as free. Promotion may be accomplished by reading the data from the storage array and storing the data in the non-volatile cache.

Figure 6:
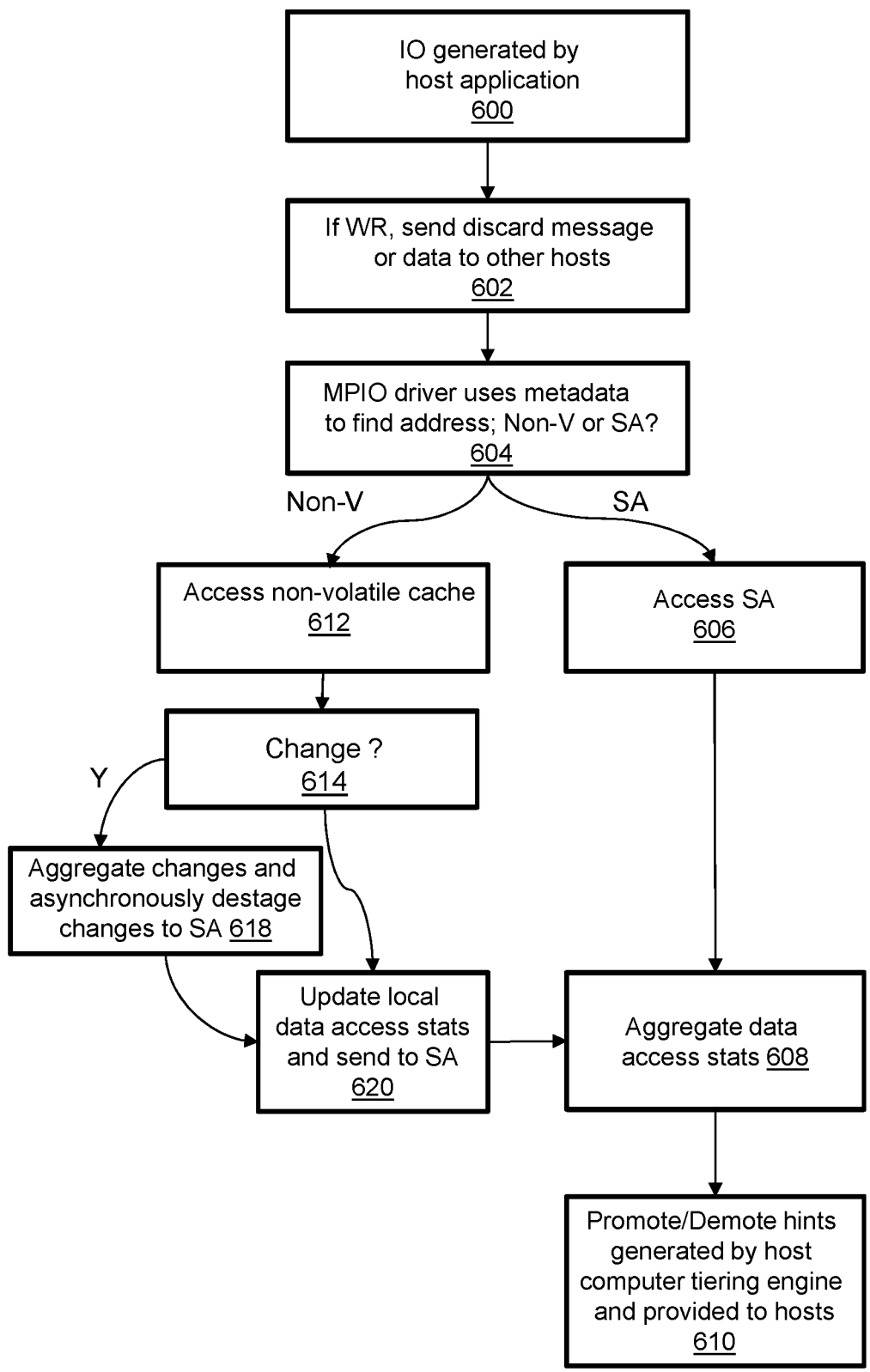
FIG. 6 illustrates a technique for aggregated host-array performance tiering in the computer network of FIGS. 3 and 4.

FIG. 6 illustrates a technique for aggregated host-array performance tiering in the computer network of FIGS. 3 and 4. If an IO generated by a host application as shown in block 600 is a write then the host computer may synchronously send a discard message or the write data to other host computers as indicated in block 602 so that those host computers do not read locally stored stale copies. The MPIO driver in the host computer uses metadata to determine the location to which the IO address maps as indicated in block 604. The IO may specify an address in the host device and the metadata may map host device address to either the non-volatile cache or the storage array. If the address maps to the storage array then the MPIO driver accesses the storage array by sending the IO as indicated in block 606. The storage array aggregates data access statistics from the storage array and host computers as indicated in block 608. The data access statistics are used by the storage array tiering engine to generate promotion and demotion hints that are provided to the host computers as indicated in block 610. At least one mechanism for providing the hints has already been described above. If the address maps to the non-volatile cache as determined in block 604 then the MPIO driver accesses the non-volatile cache as indicated in block 612. As determined in block 614, if the access results in a change, e.g. if the IO is a write, then thehe host computer may aggregate the change with other changes over some period of time and asynchronously destage those changes to the storage array as shown in block 618. Regardless of whether or not there was a change as determined in block 614 the host computer updates a record of local data access statistics as indicated in block 620. The local data access statistics may be sent to the storage array as also indicated in block 620. The statistics may be passed to the storage array using VU log select page. The storage array aggregates the data access statistics as indicated in block 608, and hints are generated by the storage array tiering engine as indicated in block 610 and already described above. Promotion and demotion may be accomplished by the MPIO drivers polling the storage array and receiving data re-allocation hints.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
a computing device comprising a processor, a non-volatile cache, a host application, and a tiering engine that causes a first extent of host application data to be demoted to a storage array and causes a second extent of host application data to be promoted to the non-volatile cache, the promotion and demotion based on likelihood of future access of the first and second extents of host application data.

2. The apparatus of claim 1 comprising a multi-path input-output driver that is responsive to an IO (input-output) request from the host application to determine whether the IO request maps to a storage array address or a non-volatile cache address, and service the request from the address to which the request maps.

3. The apparatus of claim 2 wherein the computing device is a first host computer that maintains a first host device that is a representation of a production volume maintained by a storage array, wherein some of the host application data of the host device is stored on the non-volatile cache, and wherein a second host computer maintains a second host device that is a representation of the production volume.

4. The apparatus of claim 3 wherein in response to a data change associated with the IO the first host computer synchronously sends the data change to the second host computer.

5. The apparatus of claim 3 wherein in response to a data change associated with the IO the first host computer synchronously sends a message to the second host computer to prompt discard of a stale copy of data associated with the IO from the second host device.

6. The apparatus of claim 5 wherein the first host computer aggregates data changes and asynchronously sends the aggregated data changes to the storage array.

7. The apparatus of claim 2 wherein in response to a data change associated with the IO the computing device updates data access statistics maintained by the computing device.

8. The apparatus of claim 7 wherein the likelihood of future access is calculated by the computing device based on the data access statistics.

9. An apparatus comprising:
a storage array comprising a plurality of computing nodes, managed drives, and a tiering engine that causes a first extent of host application data to be demoted from non-volatile caches of a plurality of host computers to the managed drives and causes a second extent of host application data to be promoted to the non-volatile caches of the plurality of host computers based on likelihood of future access of the first and second extents of host application data.

10. The apparatus of claim 9 wherein the tiering engine calculates the likelihood of future access based in part on data access statistics provided to the storage array by the plurality of computing nodes and generates hints.

11. A method comprising:
in a network comprising a plurality of host computers and a storage array, wherein the host computers run instances of a host application that share a data set that is maintained on production volume that is presented by the storage array:
storing at least a first extent of host application data in non-volatile caches of the host computers, wherein the non-volatile caches represent a first tier of storage;
storing at least a second extent of host application data in a managed drive of the storage array, wherein the managed drive represents a second tier of storage; and
demoting the first extent of host application data to the storage array and promoting the second extent of host application data to the non-volatile caches based on likelihoods of future access of the first and second extents of host application data.

12. The method of claim 11 comprising responding to an IO (input-output) request from one of the instances of the host application by determining whether the IO request maps to a storage array address or a non-volatile cache address.

13. The method of claim 12 comprising servicing the request from the address to which the request maps.

14. The method of claim 13 comprising a first one of the host computers maintaining a first host device that is a representation of the production volume, wherein at least some host device data is stored on the non-volatile cache, and a second one of the host computers maintaining a second host device that is a representation of the production volume.

15. The method of claim 14 comprising, responsive to a data change associated with the IO, the first host computer synchronously sending the data change to the second host computer.

16. The method of claim 14 comprising, responsive to a data change associated with the IO, the first host computer synchronously sending a message to the second host computer to prompt discard of a stale copy of data associated with the IO from the second host device.

17. The method of claim 16 comprising the first host computer aggregating data changes and asynchronously sending the aggregated data changes to the storage array.

18. The method of claim 11 comprising the first and second computing devices updating data access statistics maintained locally by the first and second computing devices, and the computing devices calculating the likelihood of future access based on the data access statistics.

19. The method of claim 11 comprising a tiering engine in the storage array generating a first hint to cause the first extent of host application data to be demoted to the storage array and generating a second hint to cause the second extent of host application data to be promoted to the non-volatile host caches.

20. The method of claim 19 comprising the tiering engine calculating the likelihood of future access based in part on data access statistics provided to the storage array by the plurality of computing nodes.

* * * * *